(12) United States Patent
Iida

(10) Patent No.: US 7,395,661 B2
(45) Date of Patent: Jul. 8, 2008

(54) METHOD OF ESTIMATING SOOT ACCUMULATION AMOUNT OF EXHAUST GAS PURIFICATION FILTER, AND COMPUTER PROGRAM PRODUCT THEREFOR

(75) Inventor: Tomohiro Iida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/546,610

(22) PCT Filed: Feb. 26, 2004

(86) PCT No.: PCT/JP2004/002287

§ 371 (c)(1),
(2), (4) Date: Jun. 23, 2006

(87) PCT Pub. No.: WO2004/076827

PCT Pub. Date: Sep. 10, 2004

(65) Prior Publication Data

US 2006/0260298 A1    Nov. 23, 2006

(30) Foreign Application Priority Data

Feb. 26, 2003    (JP) .............................. 2003-049531
Mar. 20, 2003    (JP) .............................. 2003-078704

(51) Int. Cl.
*F01N 3/00*    (2006.01)
(52) U.S. Cl. .............................. 60/297; 60/278; 60/280; 60/295; 60/311
(58) Field of Classification Search ................... 60/274, 60/278, 280, 287, 291, 295, 297, 311
See application file for complete search history.

(56) References Cited

U.S. PATENT DOCUMENTS 5,121,601 A * 6/1992 Kammel ...................... 60/275

(Continued)

FOREIGN PATENT DOCUMENTS

FR    WO 03/025355 A1 *    3/2003 .................. 60/295

(Continued)

*Primary Examiner*—Binh Q. Tran
(74) *Attorney, Agent, or Firm*—Oliff & Berridge, PLC

(57) ABSTRACT

A soot accumulation amount estimation method for an exhaust gas purification filter according to the present invention includes: a first step of burning soot collected in pores of the exhaust gas purification filter (22) to regenerate the filter (22); a second step of detecting a temperature of exhaust gas flowing into the filter (22), to judge whether or not the exhaust gas temperature is equal to or lower than a predetermined temperature at which a soot amount flowing into the filter (22) is substantially equal to a soot amount to be burnt in the filter (22); a third step of adding up a period of time during which the exhaust gas temperature is equal to or lower than the predetermined temperature, when the exhaust gas temperature is equal to or lower than the predetermined temperature; when the a fourth step of judging whether or not the added up period of time is equal to or longer than a period of time during which a predetermined amount of soot is accumulated in the pores after the first step; and a fifth step of estimating a soot accumulation amount of the filter (22) based on a pressure loss through the filter (22), when the added up period of time is equal to or longer than the period of time during which the predetermined amount of soot is accumulated.

10 Claims, 10 Drawing Sheets

U.S. PATENT DOCUMENTS

| | | |
|---|---|---|
| 6,758,039 B2 * | 7/2004 | Kuboshima et al. ............ 60/311 |
| 6,829,890 B2 * | 12/2004 | Gui et al. ...................... 60/295 |
| 7,031,827 B2 * | 4/2006 | Trudell et al. ................ 701/114 |
| 7,065,960 B2 * | 6/2006 | Gioannini et al. ............. 60/295 |

FOREIGN PATENT DOCUMENTS

| | | | |
|---|---|---|---|
| JP | A 64-077718 | 3/1989 |
| JP | A 03-199615 | 8/1991 |
| JP | U 05-69312 | 9/1993 |
| JP | A 10-089048 | 4/1998 |
| JP | A 2001-280118 | 10/2001 |

* cited by examiner

METHOD OF ESTIMATING SOOT ACCUMULATION AMOUNT OF EXHAUST GAS PURIFICATION FILTER, AND COMPUTER PROGRAM PRODUCT THEREFOR

TECHNICAL FIELD

The present invention relates to a soot accumulation amount estimating method of accurately estimating a soot amount collected by an exhaust gas purification filter configured to collect black smoke particulates contained in exhaust gas of a diesel engine and to purify it, and a computer program product therefore.

BACKGROUND ART

Diesel engines are power sources excellent in mileage and durability, and emit hydrocarbons (HC) and carbon monoxide (CO) in smaller amounts than gasoline engines. Thus, diesel engines are internal combustion engines suitable for mitigating a recent problem of global warming.

However, as compared with gasoline engines, diesel engines emit larger amounts of nitrogen oxides (NOx) and black smoke particulates to be generated upon combustion of air-fuel mixtures. This brings about a problem to be immediately solved by decreasing amounts of BOX and soot in exhaust gas.

In this respect, there has been known an exhaust gas purification system including: an oxidation catalyst disposed in a flow passage of exhaust gas from a diesel engine; and an exhaust gas purification filter disposed downstream the oxidation catalyst and having a ceramic porous wall acting as a filter element. In the exhaust gas purification system, NO, CO, HC, and the like in exhaust gas emitted from the diesel engine are oxidized by the oxidation catalyst, and soot contained in exhaust gas after oxidation is collected by pore portions of the porous wall of the exhaust gas purification filter as the exhaust gas after oxidation passes through the porous wall.

In the exhaust gas purification system, soot is collected by the pore portions within the wall and the surface of the wall, and the collected soot is removed by combustion with unburnt HC, CO, and the like. In this case, the filter may be damaged due to heat to be caused upon combustion removal of soot. This brings about a limitation of soot amount collectable by the filter, lest the filter is damaged by heat.

There has been thus disclosed the following technique for preventing damage due to heat (see S.A.E. article 2000-01-0473, "Passenger Car Serial Application of a Particulate Filter System on a Common Rail Direct Injection Diesel Engine"). This system is configured to estimate a soot amount accumulated within a filter by detecting a difference (pressure loss) between exhaust gas pressures at an upstream side and a downstream side of an exhaust gas purification filter, and an exhaust gas temperature thereat. Further, based on the thus estimated value, it is detected whether or not the exhaust gas purification filter is at a collection limit (which represents collection of soot reaching a regeneration limit). Upon detection of such a collection limit, the system thereafter supplies exhaust gas at a temperature higher than a soot inflammation temperature, to the exhaust gas purification filter through an oxidation catalyst, to thereby burn and remove the collected soot.

The above-mentioned exhaust gas purification filter regeneration method is configured to estimate a soot accumulation amount in the exhaust gas purification filter based on a pressure loss between the upstream side and downstream side of the filter, and to ascertain that the filter is at a soot accumulation limit. Namely, the exhaust gas purification filter regeneration method is configured to estimate a collection limit based on a relationship between the soot accumulation amount and the pressure loss in the exhaust gas purification filter.

In the above, regeneration of the exhaust gas purification filter is to be achieved by exhaust gas from the diesel engine, thereby causing a possibility that soot is not fully removed by combustion thereof at one time and is thus left as residual soot in the filter, depending on a driving condition of the engine.

The residual soot tends to affect an ascertaining operation of a soot accumulation limit upon conducting the next regeneration, thereby making it necessary to ascertain the residual soot accumulation amount.

However, in the exhaust gas purification filter regeneration method, once regenerating the catalyst causes partial combustion, movement of soot, and the like, thereby making it impossible to accurately recapture a pressure loss relative to a soot accumulation amount. This makes it difficult for the exhaust gas purification filter regeneration method to estimate an accurate residual soot accumulation amount from a pressure loss.

DISCLOSURE OF INVENTION

The present invention has been carried out in view of the above circumstances. It is an object present invention to provide a soot accumulation amount estimation method capable of accurately estimating a soot accumulation amount of an exhaust gas purification filter based on a pressure loss through the exhaust gas purification filter, and a computer program product therefore.

To achieve the above object, according to a first embodiment of the present invention, a soot accumulation amount estimation method for an exhaust gas purification filter comprises: a first step of burning soot collected in pores of the exhaust gas purification filter to regenerate the filter; a second step of detecting a temperature of exhaust gas flowing into the filter, to judge whether or not the exhaust gas temperature is equal to or lower than a predetermined temperature at which a soot amount flowing into the filter is substantially equal to a soot amount to be burnt in the filter; a third step of adding up a period of time during which the exhaust gas temperature is equal to or lower than the predetermined temperature, when the exhaust gas temperature is equal to or lower than the predetermined temperature; a fourth step of judging whether or not the added up period of time is equal to or longer than a period of time during which a predetermined amount of soot is accumulated in the pores after the first step; and a fifth step of estimating a soot accumulation amount of the filter based on a pressure loss through the filter, when the added up period of time is equal to or longer than the period of time during which the predetermined amount of soot is accumulated.

According to a second embodiment of the present invention, a soot accumulation amount estimation method for an exhaust gas purification filter comprises: a first step of burning soot collected in pores of the exhaust gas purification filter to regenerate the filter; a second step of judging whether or not an operation state of an engine is in a burning operation state where a soot amount to be burnt within the filter is larger than a soot amount flowing into the filter; a third step of judging whether or not the engine is continuously operated for a predetermined period of time or longer so as to burn out soot within the pores, when the operation state of the engine is judged to be in the burning operation state; and a fourth step of estimating a soot accumulation amount of the filter based on a pressure loss through the filter, when it is judged that the engine is continuously operated in the burning operation state for the predetermined period of time.

According to a third embodiment of the present invention, a computer program product comprises: a recording medium; means recorded in the recording medium and configured to detect a temperature of exhaust gas flowing into the filter, to judge whether or not the exhaust gas temperature is equal to or lower than a predetermined temperature at which a soot amount flowing into the filter is substantially equal to a soot amount to be burnt in the filter; means recorded in the recording medium and configured to add up a period of time during which the exhaust gas temperature is equal to or lower than the predetermined temperature, when the exhaust gas temperature is equal to or lower than the predetermined temperature; means recorded in the recording medium and configured to judge whether or not the added up period of time is equal to or longer than a period of time during which a predetermined amount of soot is accumulated in the pores after the filter regeneration; and means recorded in the recording medium and configured to estimate a soot accumulation amount of the filter based on a pressure loss through the filter, when the added up period of time is equal to or longer than the period of time during which the predetermined amount of soot is accumulated.

According to a fourth embodiment of the present invention, a computer program product comprises: a recording medium; means recorded in the recording medium and configured to judge whether or not an operation state of an engine is in a burning operation state where a soot amount to be burnt within the filter is larger than a soot amount flowing into the filter; means recorded in the recording medium and configured to judge whether or not the engine is continuously operated for a predetermined period of time or longer so as to burn out soot within the pores, when the operation state of the engine is judged to be in the burning operation state; and means recorded in the recording medium and configured to estimate a soot accumulation amount of the filter based on a pressure loss through the filter, when it is judged that the engine is continuously operated in the burning operation state for the predetermined period of time.

BEST MODE FOR CARRYING OUT THE INVENTION

There will be explained embodiments of a soot accumulation amount estimation method for an exhaust gas purification filter and a computer program product therefore according to the present invention, with reference to the accompanying drawings.

First Embodiment

Figure 1:
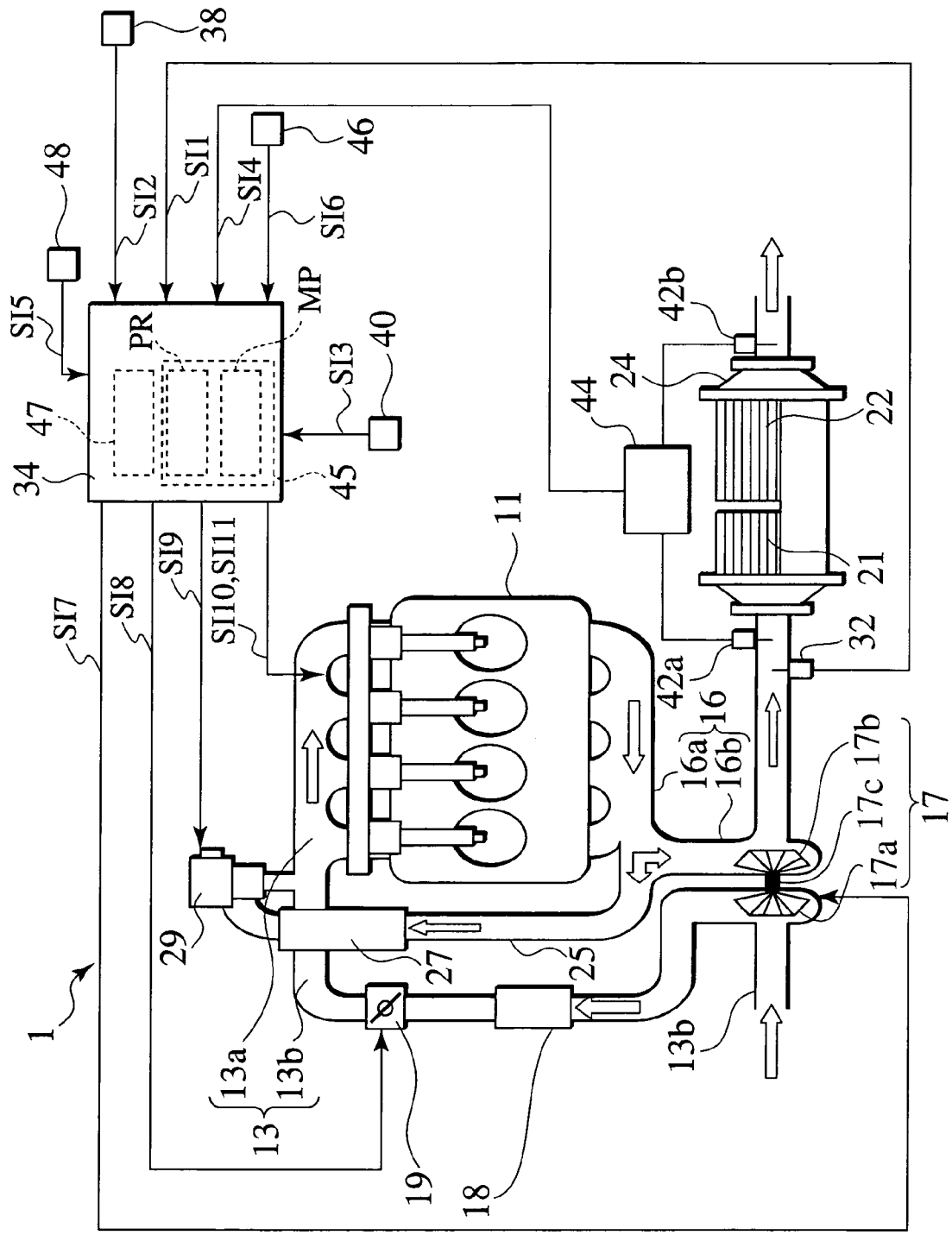
FIG. 1 is a schematic view of an exhaust gas purification system according to a first embodiment of the present invention configured to execute a soot accumulation amount estimation method.

As shown in FIG. 1, reference numeral 1 designates an exhaust gas purification system for purifying exhaust gas emitted from a diesel engine 11 of an exhaust gas recirculation type (EGR type).

Namely, the engine 11 includes intake ports connected with an intake pipe 13b through an intake manifold 13a, and exhaust ports connected with an exhaust pipe 16b through an exhaust manifold 16a. The intake manifold 13a and intake pipe 13b constitute an intake passage 13, and the exhaust manifold 16a and exhaust pipe 16b constitute an exhaust passage 16. The intake pipe 13b is provided with: a compressor wheel 17a of a turbocharger 17; and an inter cooler 18 located downstream thereof in terms of intake and configured to cool a sucked mixture compressed by the compressor wheel 17a. In turn, the exhaust pipe 16b is provided with a turbine wheel 17b of the turbocharger 17. The compressor wheel 17a and turbine wheel 17b are interconnected with a shaft 17c.

The thus configured intake line causes a sucked mixture to flow toward the compressor wheel 17a through the intake pipe 13b. The sucked mixture flowed toward the compressor wheel 17a is compressed thereby to a high temperature, thereafter cooled by the inter cooler 18, and then supplied to the engine 11 through an intake throttle 19 for adjustment of an intake amount.

Provided at an exit side of the exhaust pipe 16b are an oxidation catalyst 21 and a diesel particulate filter (DPF) 22, in an order from an upstream side of exhaust gas. The oxidation catalyst 21 is one for oxidizing NO, HC, CO, and the like in exhaust gas, and the DPF 22 is a filter for collecting soot comprising black smoke particulates in exhaust gas. The oxidation catalyst 21 and DPF 22 are accommodated within a catalyst container 24 in a cylindrical shape provided by enlarging a diameter of the exhaust pipe 16b.

Usable as the oxidation catalyst 21 is a platinum based catalyst. Examples of platinum based catalysts include a platinum-alumina catalyst, a platinum-zeolite catalyst, and a platinum-zeolite-alumina catalyst. The platinum-alumina catalyst is prepared by coating a slurry containing an alumina powder as a carrier onto a honeycomb substrate comprising cordierite, and then causing the carrier to carry platinum thereon. The platinum-zeolite catalyst is prepared by coating a slurry containing a hydrogen ion exchange zeolite powder (such as H-ZSM-5) as a carrier onto a honeycomb substrate comprising cordierite, and then causing the carrier to carry platinum thereon. Further, the platinum-zeolite-alumina catalyst is prepared by coating a slurry containing a hydrogen ion exchange zeolite powder and an alumina powder onto a honeycomb substrate comprising cordierite, and then causing the carrier to carry Pt thereon.

Figure 2:
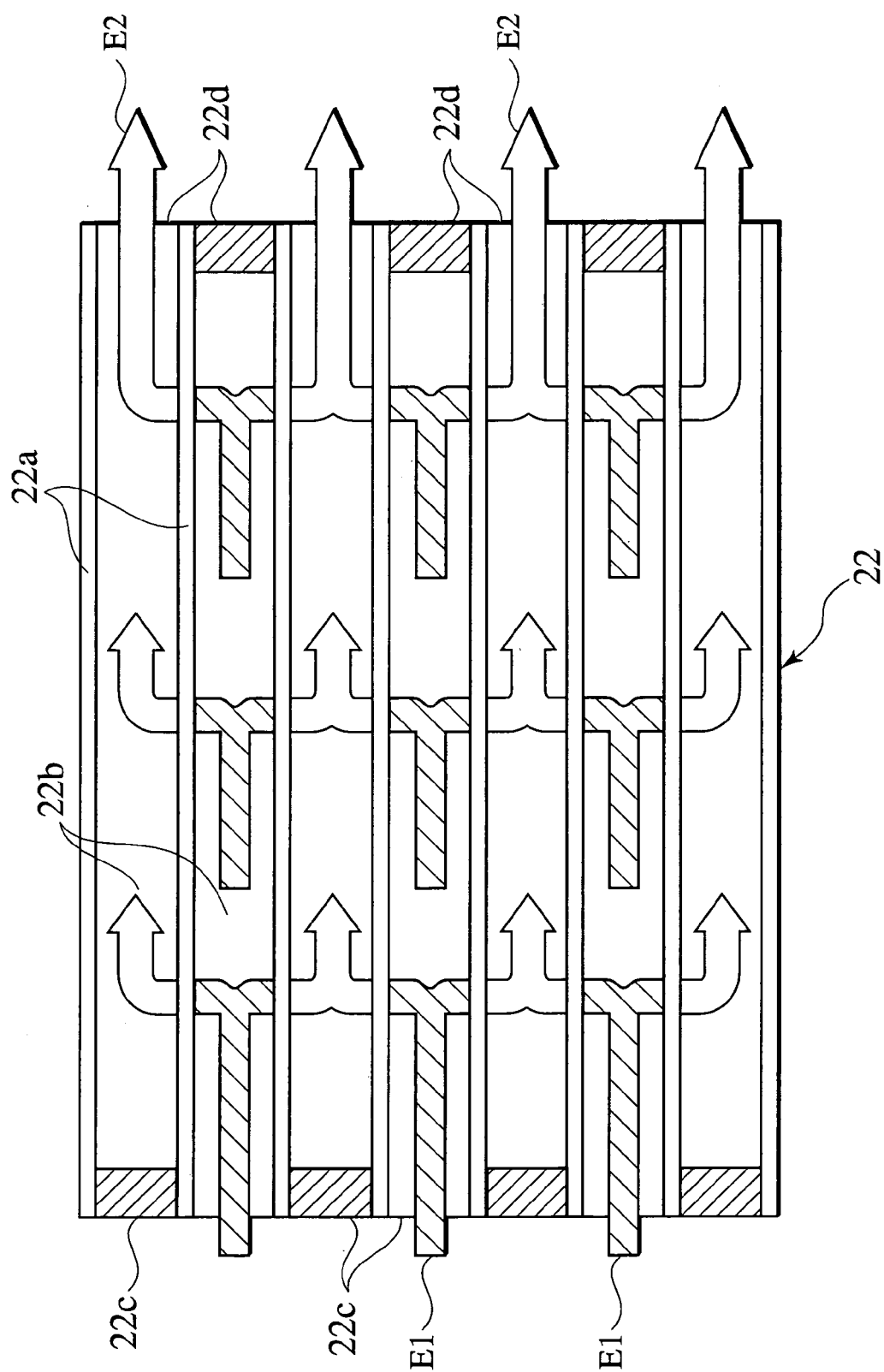
FIG. 2 is a cross-sectional view of a DPF shown in FIG. 1.

The DPF 22 is a porous honeycomb filter comprising ceramic such as cordierite or SiC. Concretely, as shown in FIG. 2, the DPF 22 has partitions 22a as filter elements each including multiple pores of diameters capable of removing soot, and thus exhibits a cross-sectional shape including polygons separately defined by the partitions 22a, respectively. The DPF 22 includes multiple cells 22b mutually parallelly defined by the partitions 22a, respectively. The cells 22b have cell inlets 22c and cell outlets 22d located adjacent to one another, respectively, which are occluded alternately and staggeredly.

As shown in FIG. 2, exhaust gas E1 emitted from the engine 11 is oxidized by the oxidation catalyst 21. Namely, components such as NO, CO, HC, and the like contained in exhaust gas are oxidized by exothermic reactions accompanying thereto. Further, the exhaust gas elevated in temperature by oxidation reactions flows into the DPF 22 through those cells opened at cell inlets 22c thereof, respectively, passes through multiple pores of the partitions 22a thereof to thereby flow into the adjacent cells 22b, and is then emitted through cell outlets 22d at open ends thereof.

During passage through the pores of the partitions 22a, soot contained in exhaust gas E1 is prevented by the pores from flowing into the adjacent cells, and is thus accumulated within the pores. This enables a soot amount contained in exhaust gas E2 passed through the DPF 22, to be remarkably decreased.

Connected to the engine 11 of the EGR type is a recirculation line 25 for exhaust gas, which is in turn connected to an EGR cooler 27 located for cooling at a downstream side of the recirculation line 25. Further, connected to the EGR cooler 27 at its downstream side is an EGR control valve 29 configured to regulate a flow rate of recirculated exhaust gas to the engine 11, and the recirculation line 25 has a downstream end connected to the intake pipe 13b of the engine 11. Namely, part of exhaust gas emitted from the engine 11 is guided by the recirculation line 25 and cooled by the EGR cooler 27, and then flows into the intake pipe 13b. Further, the sucked mixture guided into the intake pipe 13b and the partial exhaust gas are mixed with each other, and flow into the engine 11. This achieves an improvement of exhaust gas purifying efficiency.

Meanwhile, provided between the turbine wheel 17b and catalyst container 24, i.e., at an inlet side (upstream side) of the oxidation catalyst 21 in the exhaust pipe 16b, is a gas temperature detecting part 32 configured to detect an exhaust gas temperature within the exhaust pipe 16b. The gas temperature detecting part 32 outputs a detection signal SI1 (gas temperature signal SI1) to be inputted into one of control input ports (not shown) of an electronic control unit (ECU) 34. Note that the ECU 34 includes a calculation unit such as a central processing unit (CPU) and a storage unit such as a memory.

Further, connected to due ones of the control input ports of the ECU 34 are: a rotation sensor 38 configured to detect a rotational speed of the engine 11; and an accelerator opening degree change sensor 40 configured to detect a change of an accelerator opening degree; respectively. The rotation sensor 38 detects an engine revolution signal SI2 and the accelerator opening degree change sensor 40 detects an accelerator opening degree signal SI3, which are inputted into the ECU 34.

The exhaust gas purification system 1 is further provided with: a first pressure sensor 42a configured to detect a pressure of exhaust gas flowing into the oxidation catalyst 21, i.e., exhaust gas upstream the oxidation catalyst 21; and a second pressure sensor 42b configured to detect a pressure of exhaust gas emitted from the DPF 22, i.e., exhaust gas downstream the DPF 22. The first pressure sensor 42a and second pressure sensor 42b are connected to a pressure detecting part 44 which is in turn connected to appropriate one of the control input ports of the ECU 34. The pressure detecting part 44 is configured to output a pressure loss signal SI4 to the ECU 34 based on signals detected by the first pressure sensor 42a and second pressure sensor 42b, respectively, which pressure loss signal represents a pressure loss equal to a pressure difference between both the detected pressures.

Connected to pertinent one of the control input ports of the ECU 34 is a gas flow detecting part 48 configured to detect a flow rate of exhaust gas flowing into the turbine wheel 17b of the turbocharger 17. To be inputted into the ECU 34 is a gas flow signal SI5 which is outputted from the gas flow detecting part 48 and represents a flow rate of exhaust gas to be emitted to the DPF 22 side through the turbine wheel 17b.

The ECU 34 is further connected with a travel distance sensor 46 configured to detect a travel distance of a vehicle having the engine 11 mounted thereon. The travel distance detected by the travel distance sensor 46 is outputted as a travel distance signal SI6 to the ECU 34.

Meanwhile, connected to the turbocharger 17 is appropriate one of control output ports (not shown) of the ECU 34. The ECU 34 controls a supercharging pressure to be achieved by the turbocharger 17, based on running information inputted through the appropriate control input ports. At this time, the ECU 34 outputs a supercharging pressure control signal SI7 to the turbocharger 17 to control it. Further, connected to the intake throttle 19 is appropriate one of control output ports of the ECU 34. Based on the running information inputted via control input ports, the ECU 34 controls a throttling degree of the intake throttle 19 to thereby control a sucked mixture supply amount to the engine 11. At this time, the ECU 34 outputs an intake amount controlling signal SI8 to the intake throttle 19 to control it. Further, appropriate one of control output ports of the ECU 34 is connected to the EGR control valve 29. Based on the running information inputted through the control input ports, the ECU 34 controls a throttling degree of the EGR control valve 29 to thereby control a supply amount of recirculated exhaust gas to the engine 11. At this time, the ECU 34 outputs an exhaust gas amount control signal SI9 to the EGR control valve 29 to control it. Further, appropriate one of control output ports of the ECU 34 is connected to the engine 11. Based on the running information inputted through the control input ports, the ECU 34 conducts combustion control. At this time, the ECU 34 outputs a regeneration start signal SI10 and a regeneration termination signal SI11 for regeneration of the DPF 22 to the engine 11 to control it.

Figure 3:
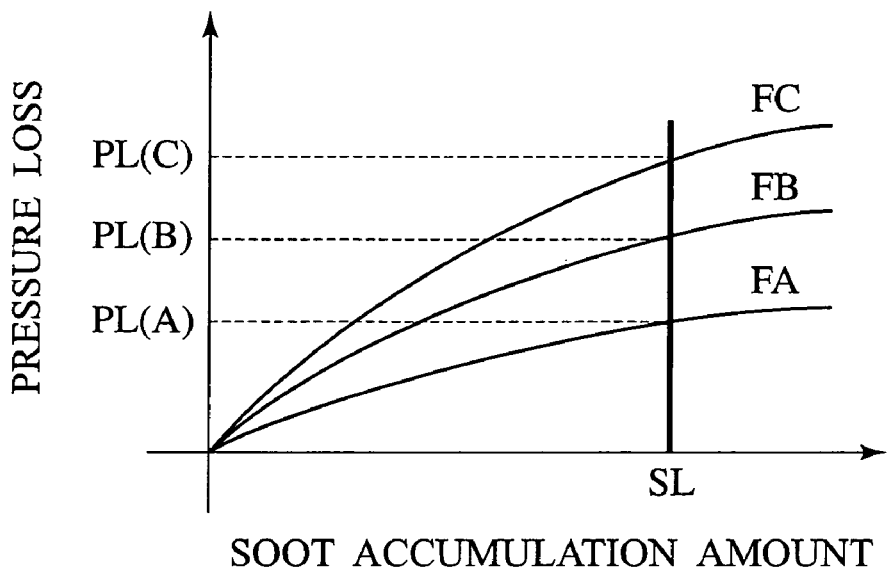
FIG. 3 is a graph for explaining contents of a map data shown in FIG. 1.

The ECU 34 includes a memory 45 having a map data MP previously stored therein, which shows a relationship between a pressure loss and a soot amount accumulated by collection by the DPF 22 for each exhaust gas flow, previously obtained at predetermined temperatures (such as TA, TB, and TC). FIG. 3 shows a pressure loss and a soot accumulation amount at each exhaust gas flow where the predetermined temperature T is TA. Here, reference characters FA, FB, and FC each represent an exhaust gas flow ($Nm^3/min$), and a reference character SL represents a collection amount limit (soot accumulation limit) to be accumulated in the filter, where soot amounts exceeding the collection amount limit lead to damage of the filter upon regeneration thereof. Further, reference characters PL(A), PL(B), and PL(C) represent pressure losses at the soot accumulation limit SL where the exhaust gas flows are FA, FB, and FC, respectively. In FIG. 3, the exhaust gas flows have a relationship of FA<FB<FC. Further, there exist relationships between pressure losses and soot accumulation amounts at each exhaust gas flow similar to that shown in FIG. 3, where the predetermined temperatures T are TB and TC, respectively.

Figure 4:
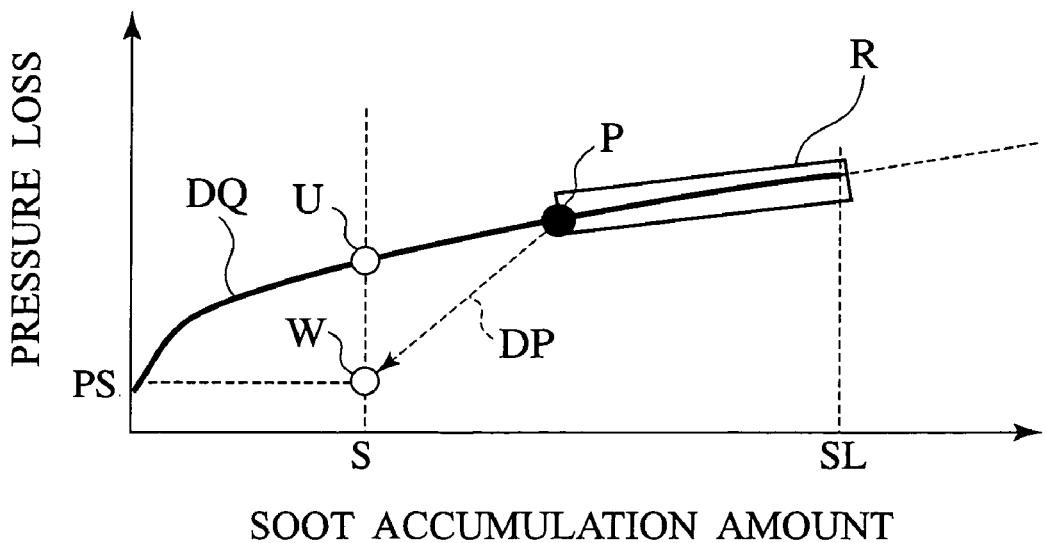
FIG. 4 is a graph of a relationship between a pressure loss and a soot accumulation amount after regeneration of the DPF.

Further stored in the memory 45 of the ECU 34 is a data representing a relationship between a pressure loss and a soot accumulation amount as shown in FIG. 4, as part of the map data MP. This data represents: a pressure loss between an upstream side and a downstream side with respect to the DPF 22; and a soot accumulation amount within the DPF 22. Namely, it includes a curve DQ representing a relationship between a soot accumulation amount of the un-regenerated DPF 22 and a pressure loss so that soot is accumulated in the DPF 22 according to the relationship along the curve DQ. Upon starting regeneration of the DPF 22 in a state where the soot amount accumulated in the DPF 22 has reached the soot accumulation limit SL (g/L), soot within pores is firstly burnt and then soot at the surfaces of the partitions 22a is burnt. At this time, pressure losses largely deviate from the curve DQ as compared with an initial state, and drops along a line DP. Namely, even for the same soot accumulation amount S, there is caused a difference of pressure loss, between: a situation where soot is accumulated starting from a state of no soot accumulation, and then accumulated to a state where soot has entered pores; and a situation where soot within pores are burnt out, and soot is left only on surfaces of the partitions 22a; (see points U and W in the figure). Due to this fact, it has been conventionally difficult to estimate a soot accumulation amount from a pressure loss after regeneration of the DPF 22.

In this respect, this embodiment is configured to estimate a residual soot accumulation amount by utilizing a region where there is a substantial correspondence between: a relationship between a soot accumulation amount of the DPF 22 after regeneration and a pressure loss; and a relationship between a soot accumulation amount of the DPF 22 before regeneration and a pressure loss. Further, in this embodiment, there is defined a soot amount confirmation region designated by a reference character R in the figure, and there are previously obtained an exhaust gas temperature condition and a period of time during which the temperature condition is to be continued, for reaching a boundary point P where the soot amount confirmation region R is established. Namely, there are previously obtained an exhaust gas temperature condition and a duration required for a soot accumulation amount to reach the point P from the point W in the figure. The temperature condition data and duration data are previously stored in the memory 45 as part of a program PR or the like to be described later.

In this embodiment, the conditional exhaust gas temperature and duration are set as follows. The exhaust gas temperature T is set at a temperature or lower, where a soot combustion amount within the pores of the DPF 22 becomes substantially equal to a soot accumulation amount, i.e., where a soot amount flowing into the DPF 22 becomes substantially equal to a soot amount to be burnt within the DPF 22. There is now defined a balance point temperature BPT where a soot amount flowing into the DPF 22 becomes substantially equal to a soot amount to be burnt within the DPF 22. In this embodiment, the balance point temperature BPT is set at 300° C. Further, the duration "t" is set to be t≧30 minutes. This enables a soot accumulation amount to reach the point P from the point W by setting an exhaust gas temperature at 300° C. or lower and a duration at 30 minutes or longer.

The ECU 34 further includes a counter 47 therein for a counting operation. The ECU 34 comprises the memory 45. The memory 45 includes the program PR stored therein for causing the ECU 34 to function based on the signals outputted from the above-mentioned sensors, respectively. The memory 45 embraces a read-only memory, a random access memory, a portable medium, and the like.

Figure 5:
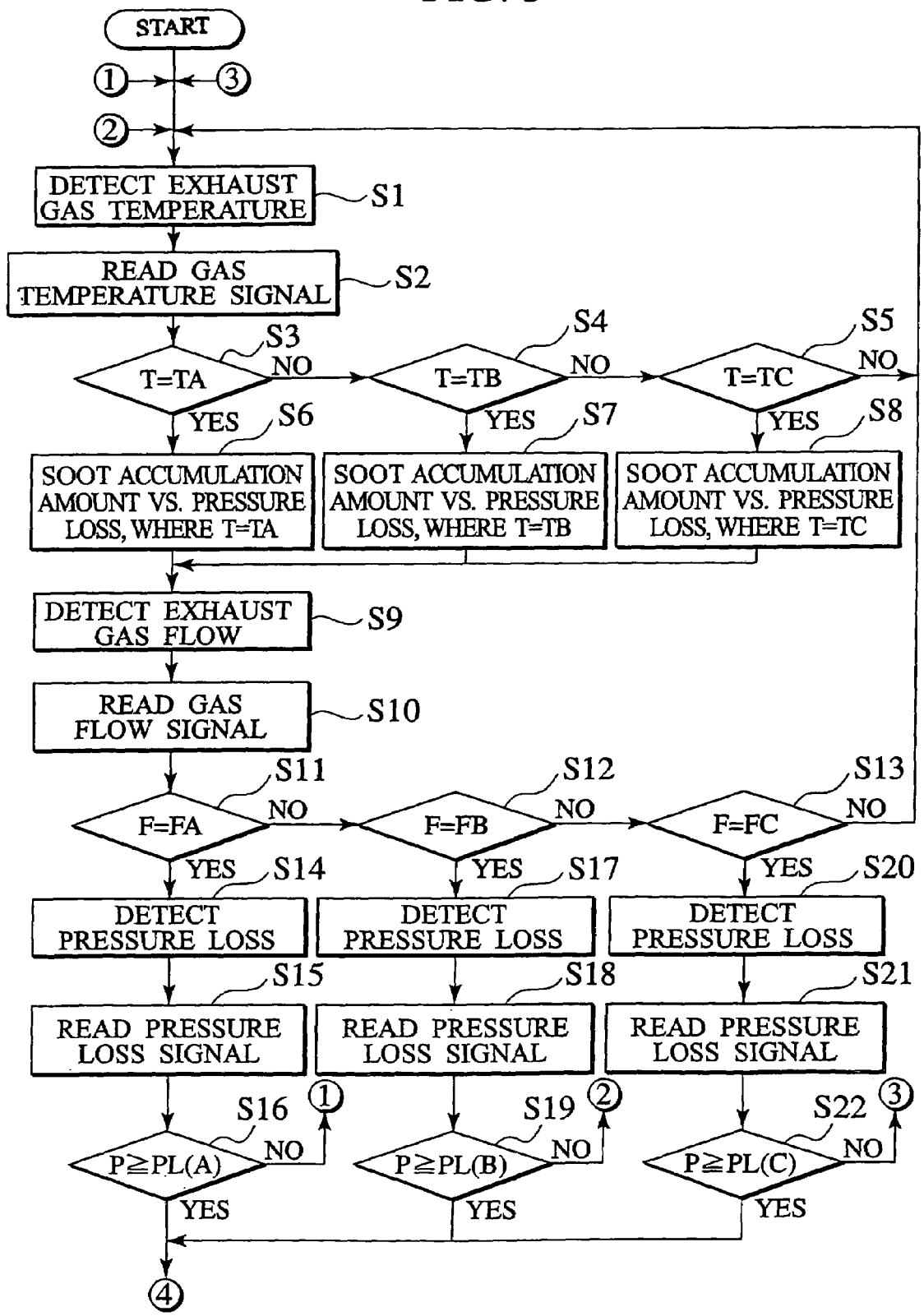
FIG. 5 is a flowchart for explaining an operation of the exhaust gas treatment system shown in FIG. 1.
Figure 6:
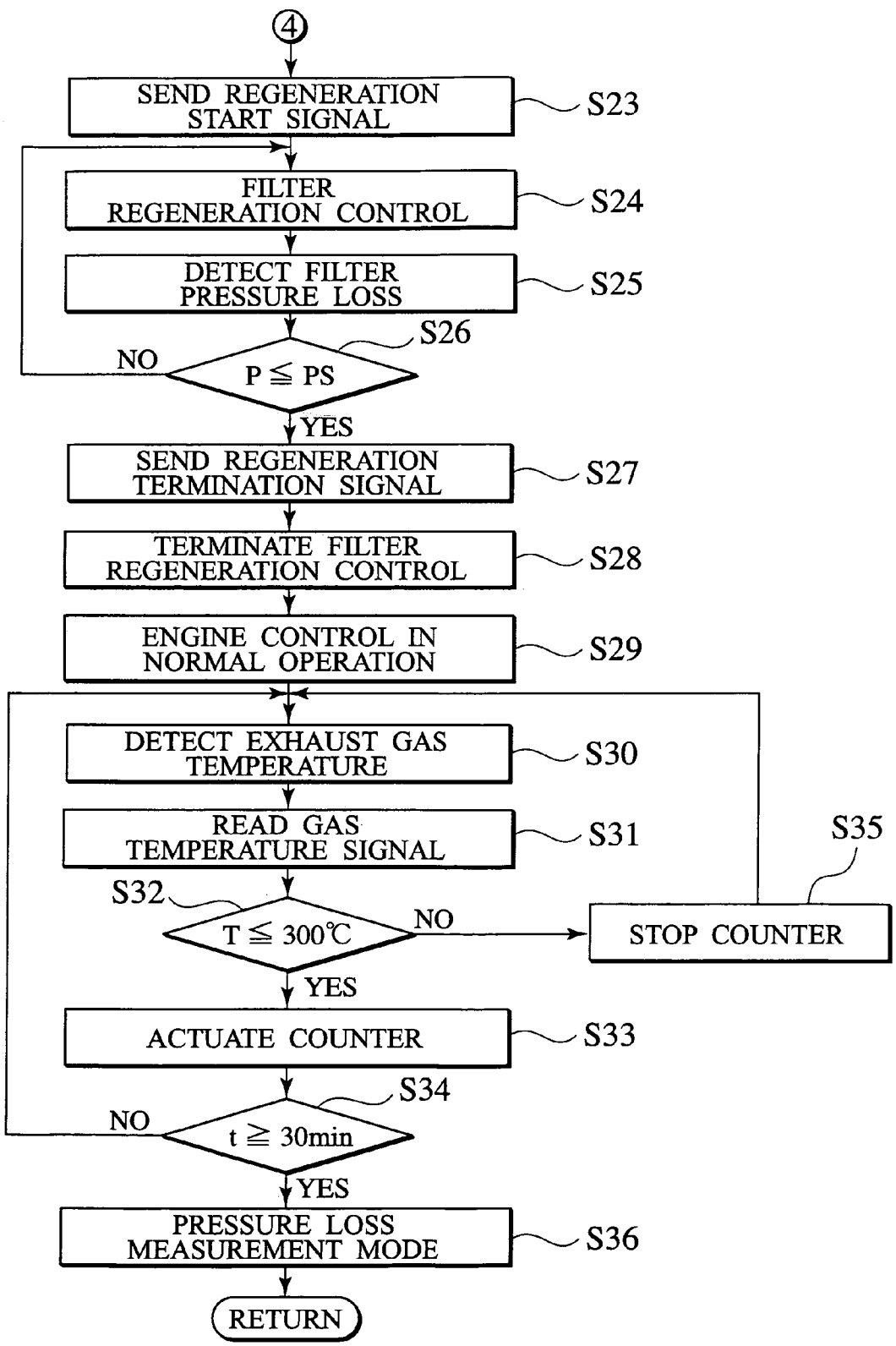
FIG. 6 is another flowchart for explaining the operation of the exhaust gas treatment system shown in FIG. 1.

There will be explained an operation of this embodiment as a whole, mainly about procedures to be conducted by the ECU 34. Note that flowcharts shown in FIG. 5 and FIG. 6 also show procedures, signals, and the like, in the exhaust gas purification system 1 as a whole.

The ECU 34 is operating in accordance with the program PR. Further, the ECU 34 is conducting filter regeneration control including soot amount estimation control shown in FIG. 5 and FIG. 6 through the control output ports, based on the running information to be inputted through the control input ports. At this time, the ECU is also executing running control for causing a vehicle to run normally.

The ECU 34 reads the gas temperature signal SI1 detected from the gas temperature detecting part 32 and sent from the gas temperature detecting part 32 (steps S1 and S2). Further, the ECU 34 judges whether or not the current exhaust gas temperature T is T=TA, T=TB, or T=TC, based on the gas temperature signal SI1 (steps S3, S4, and S5).

When it is judged YES at step S3, i.e., when the current exhaust gas temperature T is T=TA, the ECU 34 refers to the map data MP corresponding to the temperature TA stored in the memory 45 to thereby ascertain a relationship between a soot accumulation amount and a pressure loss (step S6). Meanwhile, when it is judged NO at step S3 and YES at step S4, the ECU 34 refers to the map data MP corresponding to the exhaust gas temperature TB stored in the memory 45 to thereby ascertain a relationship between a soot accumulation amount and a pressure loss (step S7). On the other hand, when it is judged NO at steps S3 and S4, and it is judged YES at step S5, i.e., when the current exhaust gas temperature T is T=TC, the ECU 34 refers to the map data MP corresponding to the exhaust gas temperature TC stored in the memory 45 to thereby ascertain a relationship between a soot accumulation amount and a pressure loss (step S8).

Next, the ECU 34 reads the gas flow signal SI5 detected by the gas flow detecting part 48 and sent from the gas flow detecting part 48 (steps S9 and S10). Based on the gas flow signal SI5, it is judged whether or not the current exhaust gas flow F is F=FA, F=FB, or F=FC (steps S11, S12, S13).

When it is judged YES at step S11, i.e., when the current exhaust gas flow F is F=FA, the ECU 34 ascertains a pressure loss PL(A) corresponding to the soot accumulation limit SL at the previously obtained current exhaust gas temperature T=TA and exhaust gas flow F=FA, based on the map data MP for the current gas temperature T=TA and exhaust gas flow F=FA. Further, the ECU reads the pressure loss signal SI4 detected by the pressure detecting part 44 and sent from the pressure detecting part 44 (step S14 and step S15). Moreover, the ECU 34 judges whether or not the current pressure loss P is equal to or larger than the pressure loss PL(A) corresponding to the soot accumulation limit SL, based on the pressure loss signal SI4 (step S16).

When it is judged NO at step S16, i.e., when the current pressure loss P is smaller than the pressure loss PL(A) corresponding to the soot accumulation limit SL, the ECU 34 judges that the current accumulation amount of the DPF 22 at the current exhaust gas temperature and exhaust gas flow is not at the limitation, thereby repeating the procedures at step S1 onward (step S16→NO).

Meanwhile, when it is judged NO at step S11 and it is judged YES at step S12, i.e., when the current exhaust gas flow F is F=FB, the ECU 34 ascertains a pressure loss PL(B) corresponding to the soot accumulation limit SL at the previously obtained current exhaust gas temperature T=TB and exhaust gas flow F=FB, based on the map data MP for the current gas temperature T=TB and exhaust gas flow F=FB. Further, the ECU reads the pressure loss signal SI4 detected by the pressure detecting part 44 and sent from the pressure detecting part 44 (step S17 and step S18). Moreover, the ECU 34 judges whether or not the current pressure loss P is equal to or larger than the pressure loss PL(B) corresponding to the soot accumulation limit SL, based on the pressure loss signal SI4 (step S19).

When it is judged NO at step S19, i.e., when the current pressure loss P is smaller than the pressure loss PL(B) corresponding to the soot accumulation limit SL, the ECU 34 judges that the current accumulation amount of the DPF 22 at the current exhaust gas temperature and exhaust gas flow is not at the limitation, thereby repeating the procedures at step S1 onward (step S19→NO).

On the other hand, when it is judged NO at step S11 and step S12 and it is judged YES at step S13, i.e., when the current exhaust gas flow F is F=FC, the ECU 34 ascertains a pressure loss PL(C) corresponding to the soot accumulation limit SL at the previously obtained current exhaust gas temperature T=TC and exhaust gas flow F=FC, based on the map data MP for the current gas temperature T=TC and exhaust gas flow F=FC. Further, the ECU reads the pressure loss signal SI4 detected by the pressure detecting part 44 and sent from the pressure detecting part 44 (step S20 and step S21). Moreover, the ECU 34 judges whether or not the current pressure loss P is equal to or larger than the pressure loss PL(C) corresponding to the soot accumulation limit SL, based on the pressure loss signal SI4 (step S22).

At this time, when one of the judgment steps is YES, i.e., the current pressure loss P is equal to or larger than the pressure loss PL corresponding to the soot accumulation limit SL, in other words, when it is judged that the current soot accumulation amount of the DPF 22 has reached a limitation, the ECU 34 sends a fuel injection signal as the regeneration start signal SI10 to the engine 11 (step S23). As a result, fuel is again injected within a combustion chamber of the engine 11 at the latter part of a combustion process, to thereby conduct filter regeneration control (step S24). According to the filter regeneration control, unburnt gas is burnt within the oxidation catalyst 21 to thereby supply exhaust gas at an elevated temperature to the DPF 22, thereby burning soot accumulated within the DPF 22.

Subsequently, the ECU 34 judges whether or not the current pressure loss P is equal to or less than a predetermined threshold value PS (steps S25 and S26). Here, the fact that the current pressure loss P is equal to or less than the predetermined threshold value PS, means that the soot amount of the DPF 22 is sufficiently decreased (see FIG. 4).

When it is judged NO at step S26, i.e., when the current pressure loss P exceeds the threshold value PS, the ECU 34 judges that the regeneration is required to be continued (step S26→NO). Then, the regeneration control through step S24 through step S26 is repeatedly conducted.

Meanwhile, when it is judged YES at step S26, i.e., when the current pressure loss P is equal to or less than the threshold value PS, the ECU 34 judges that soot within the DPF 22 is sufficiently burnt out (step S26→YES). It sends a fuel injection termination signal as the regeneration termination signal SI11 to the engine 11, to thereby terminate the filter regeneration control (steps S27 and S28).

In this way, the filter regeneration control is terminated, and the ECU 34 reverts to engine control in a normal operation (step S29).

Thereafter, the ECU 34 ascertains a soot accumulation amount remaining in the DPF 22 after regeneration. To this end, the ECU 34 reads the gas temperature signal SI1 detected by the gas temperature detecting part 32 (steps S30 and S31), and judges whether or not the gas temperature signal SI1 is 300° C or lower (step S32).

When the exhaust gas temperature is 300° C. or lower as a result of the judgment at step S32 (step S32→YES), the ECU 34 actuates the counter 47 to start a time count procedure (step S33). Then, the ECU 34 judges whether or not the period of time "t" added up by the counter 47 is 30 minutes or longer (step S34). When it is shorter than 30 minutes as a result of the judgment at step S34, the ECU 34 returns to the procedure at step S30, and then repetitively executes the time count procedure at step S30 onward.

Meanwhile, when the gas temperature signal SI1 for exhaust gas represents a temperature exceeding 300° C. (step S32→YES), the ECU 34 temporarily stops the time count procedure by the counter 47 (step S35), and then repetitively executes the procedure at step S30 onward.

When it is judged at step S34 that the period of time "t" added up in the counter 47 is 30 minutes or longer, the relationship between the current soot accumulation amount and the pressure loss is brought to enter the soot amount confirmation region R. Namely, when the engine 11 is operated for 30 minutes at an exhaust gas temperature of 300° C. or lower in a situation where the relationship between a soot accumulation amount and a pressure loss after burning out is located at the point W in FIG. 4, the relationship between a soot accumulation amount and a pressure loss is brought to the boundary point P. This brings the relationship between the current soot accumulation amount and the pressure loss, into the soot amount confirmation region R, thereby enabling an accurate ascertainment of a soot accumulation amount based on a pressure loss.

Thereafter, the ECU 34 transfers to a pressure loss measurement mode, and is capable of accurately estimating a current soot accumulation amount of the DPF 22, based on the pressure loss signal SI4 sent from the pressure detecting part 44 (step S36).

It is also possible to introduce a step for measuring a pressure loss through the DPF 22 after transference to the pressure loss measurement mode, thereby confirming whether or not the current pressure loss is located within the soot amount confirmation region R. This enables to assuredly obtain an accurate soot accumulation amount. Concretely, after transference to the pressure loss measurement mode, the ECU 34 measures a pressure loss through the DPF 22, and confirms whether or not the current pressure loss is located within the soot amount confirmation region R based on the pressure loss signal SI4 and based on the data shown in FIG. 4 stored in the map data. Thereafter, upon judgment that the current pressure loss is located within the soot amount confirmation region R, the ECU 34 ascertains the current soot accumulation amount based on the current pressure loss and the data shown in FIG. 4.

As described above, this embodiment is configured to controllingly bring an exhaust gas temperature to the balance point temperature or lower after regeneration of the DPF 22, and to keep this state for a certain period of time, thereby bringing a soot accumulation amount into the soot amount confirmation region R. Further, there is measured a pressure loss at a time point when the relationship between the residual soot accumulation amount and a pressure loss after the regeneration is located within the soot amount confirmation region R, thereby enabling to more accurately estimate a soot accumulation amount (residual soot accumulation amount).

As such, it becomes possible to accurately ascertain a soot accumulation limit based on the estimated residual soot accumulation amount also at the next regeneration, thereby enabling achievement of DPF regeneration control in a reliable manner.

Note that numerical values adopted in this embodiment are exemplary, and different numerical values are used for different DPF's, exhaust gas purification systems, and the like, of course.

Second Embodiment

There will be explained this embodiment with reference to the drawings, and explanation is omitted for those parts common to the first embodiment.

Figure 7:
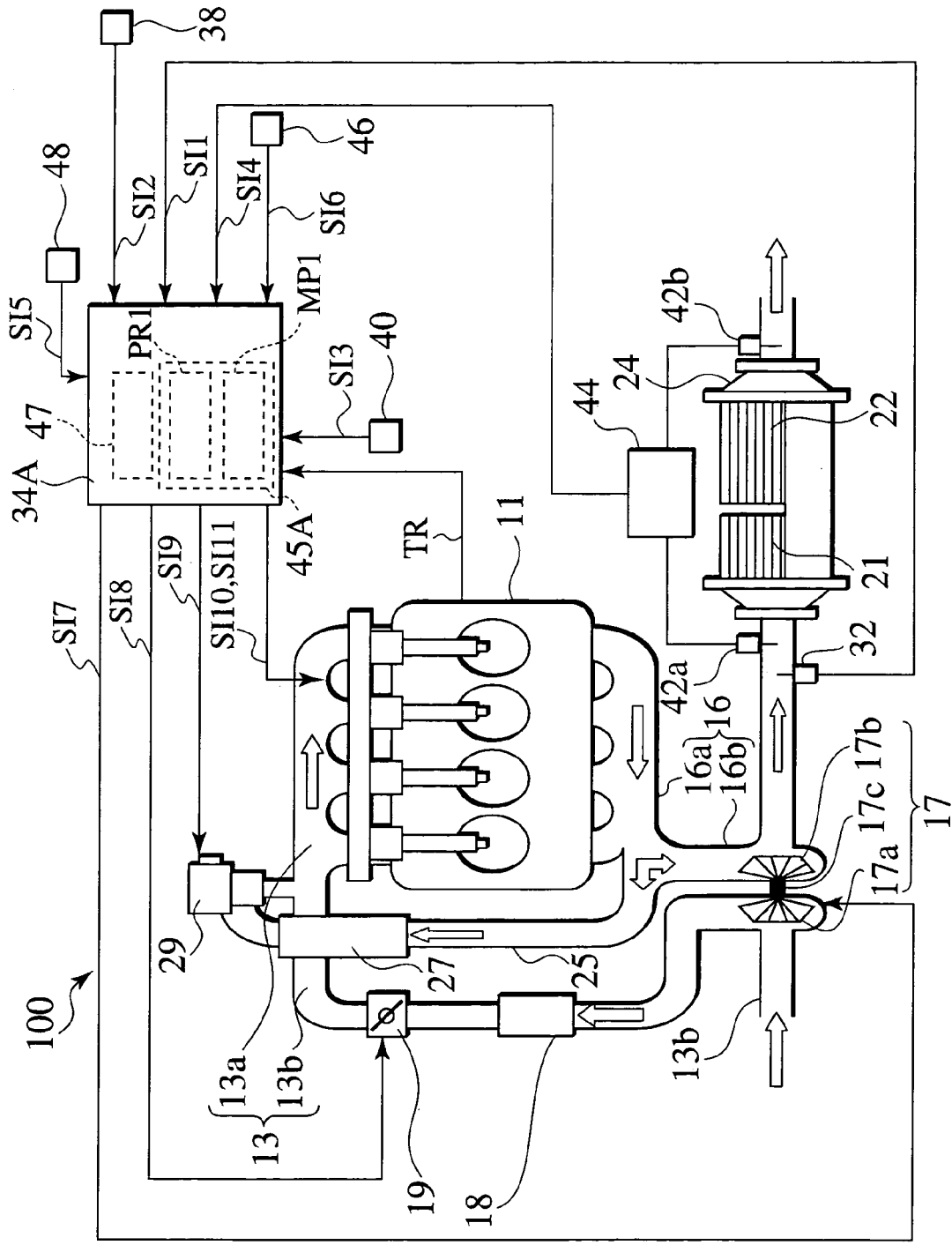
FIG. 7 is a schematic view of an exhaust gas purification system according to a second embodiment of the present invention configured to execute a soot accumulation amount estimation method.

In an exhaust gas purification system 100 of this embodiment shown in FIG. 7, it is possible to detect a torque of an engine 11 by a torque sensor. Further, the detected torque is to be sent as a torque signal TR to an ECU 34A.

Similarly to the first embodiment, the ECU 34A includes a memory 45A having a map data MP previously stored therein, which shows a relationship between a pressure loss and a soot amount accumulated by collection by a DPF 22 for each exhaust gas flow, previously obtained at predetermined temperatures (such as TA, TB, and TC) (see FIG. 3).

Figure 8:
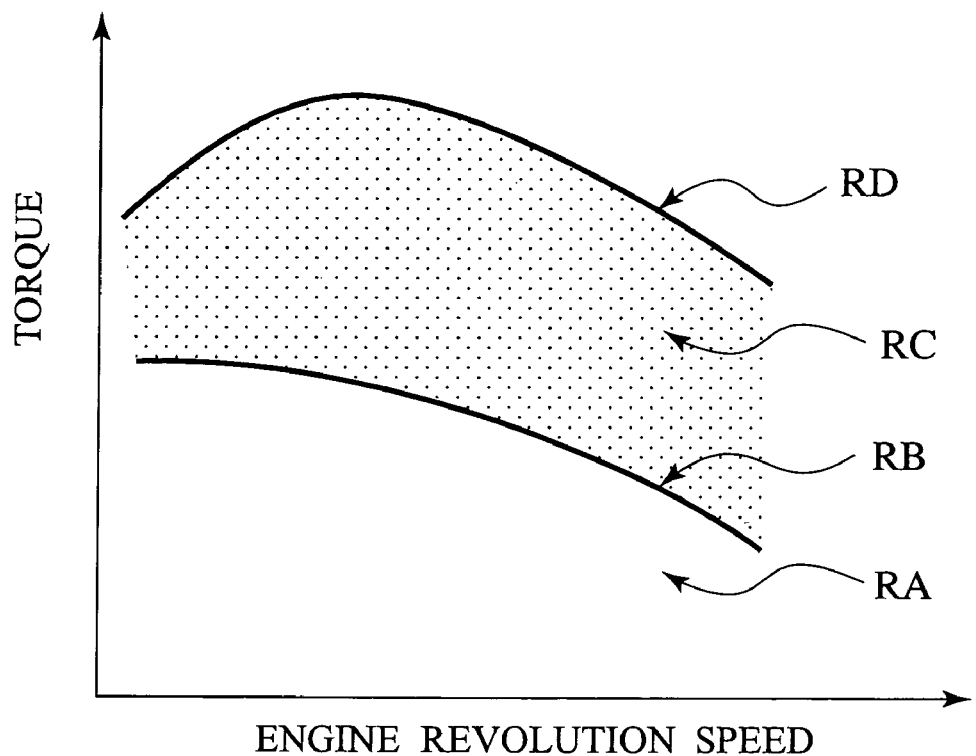
FIG. 8 is a graph of a relationship between an engine revolution speed and a torque in a full load operation, and a relationship between the engine revolution speed and the torque in a balance point region.

Here, FIG. 8 shows a relationship between an engine revolution speed and a torque of the engine 11 in the exhaust gas purification system 100 according to the second embodiment of the present invention. Concretely, FIG. 8 is a graph of a relationship between an engine revolution speed and a torque, when the engine 11 is driven in an operation state where the exhaust gas temperature corresponds to the balance point temperature BPT, i.e., in an operation state where a soot amount flowing into the DPF 22 is substantially equal to a soot amount to be burnt within the DPF 22. Note that there is defined a balance point region (RB) where an engine revolution speed and a torque are in such a state that a soot amount flowing into the DPF 22 is substantially equal to a soot amount to be burnt within the DPF 22.

As shown in FIG. 8, a soot accumulation amount (soot generation amount) becomes larger than the soot combustion amount of the DPF 22, in a situation (represented by "RA" in the figure) where the engine 11 is driven in an operation state below the balance point region (RB). In turn, the soot combustion amount of the DPF 22 becomes larger than a soot accumulation amount (soot generation amount), in a situation (represented by "RC" in the figure) where the engine 11 is driven in an operation state above the balance point region.

Namely, when the engine 11 is driven continuously for a predetermined period of time or longer within a region above the balance point region, soot within pores of the DPF 22 is burnt out. Although this period of time varies depending on the configuration of the DPF 22 and the like, there is set an operational duration of about 10 seconds for the DPF 22 in this embodiment, which operational duration is minimally required for burning out soot in the pores under the above-mentioned operational condition of the engine 11.

In this embodiment, stored in the memory 45A as parts of a map data MP1 are: a data (balance point operation data) representing a relationship between a torque and a revolution speed, which relationship represents the balance point region shown in FIG. 8; and a data representing the operational duration.

Figure 9:
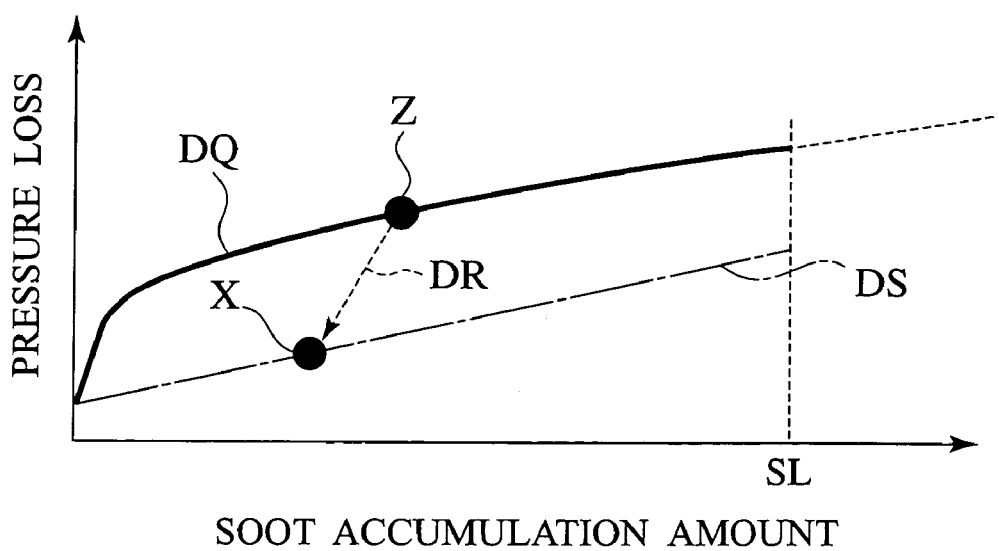
FIG. 9 is a graph for explaining contents of a map data shown in FIG. 7.

Further stored in the memory 45A as part of the map data MP1, is a data representing a relationship between a soot accumulation amount and a pressure loss such as shown in FIG. 9. Shown in FIG. 9 is a relationship DS between a soot accumulation amount and a pressure loss in a state where soot is accumulated only on a wall surface of the DPF 22, when soot within pores of the DPF 22 has been burnt out, i.e., when an operation above the balance point region is continued for 10 seconds or longer.

As shown in FIG. 9, there is burnt soot accumulated within the pores of the DPF 22 or on the wall surface thereof after starting regeneration of the DPF 22, thereby decreasing a pressure loss. Namely, the relationship between the pressure loss and the soot accumulation amount deviates from a relationship DQ between a soot accumulation amount and a pressure loss. This leads to a relationship DR between a pressure loss and a soot accumulation amount after regeneration, which relationship coincides with the relationship DS between soot accumulated only on the wall surface of the DPF 22 and the pressure loss.

In other words, there is burnt soot within the pores of the DPF 22, as an engine operation is conducted for a predetermined period of time at an engine revolution speed and a torque above the balance point region. This causes a pressure loss to be decreased from a point Z to a point X in the figure, thereby subsequently enabling an accurate ascertainment of a soot accumulation amount based on the relationship DS between the soot accumulation amount and the pressure loss.

Further, the ECU 34A comprises the memory 45A. The memory 45A includes a program PR1 stored therein for causing the ECU 34A to function based on the signals outputted from the above-mentioned sensors, respectively.

Note that components other than the ECU 34A and memory 45A in this embodiment are substantially the same as those components in the exhaust gas purification system 1 shown in FIG. 1, and the explanation thereof is omitted.

Next, there will be explained an operation of this embodiment as a whole, mainly about procedures to be conducted by the ECU 34A.

Also in this embodiment, there are executed procedures at step S1 through step S29 identically to the first embodiment, to thereby terminate filter regeneration control for the DPF 22 and to control the engine 11 in a normal operation.

Figure 10:
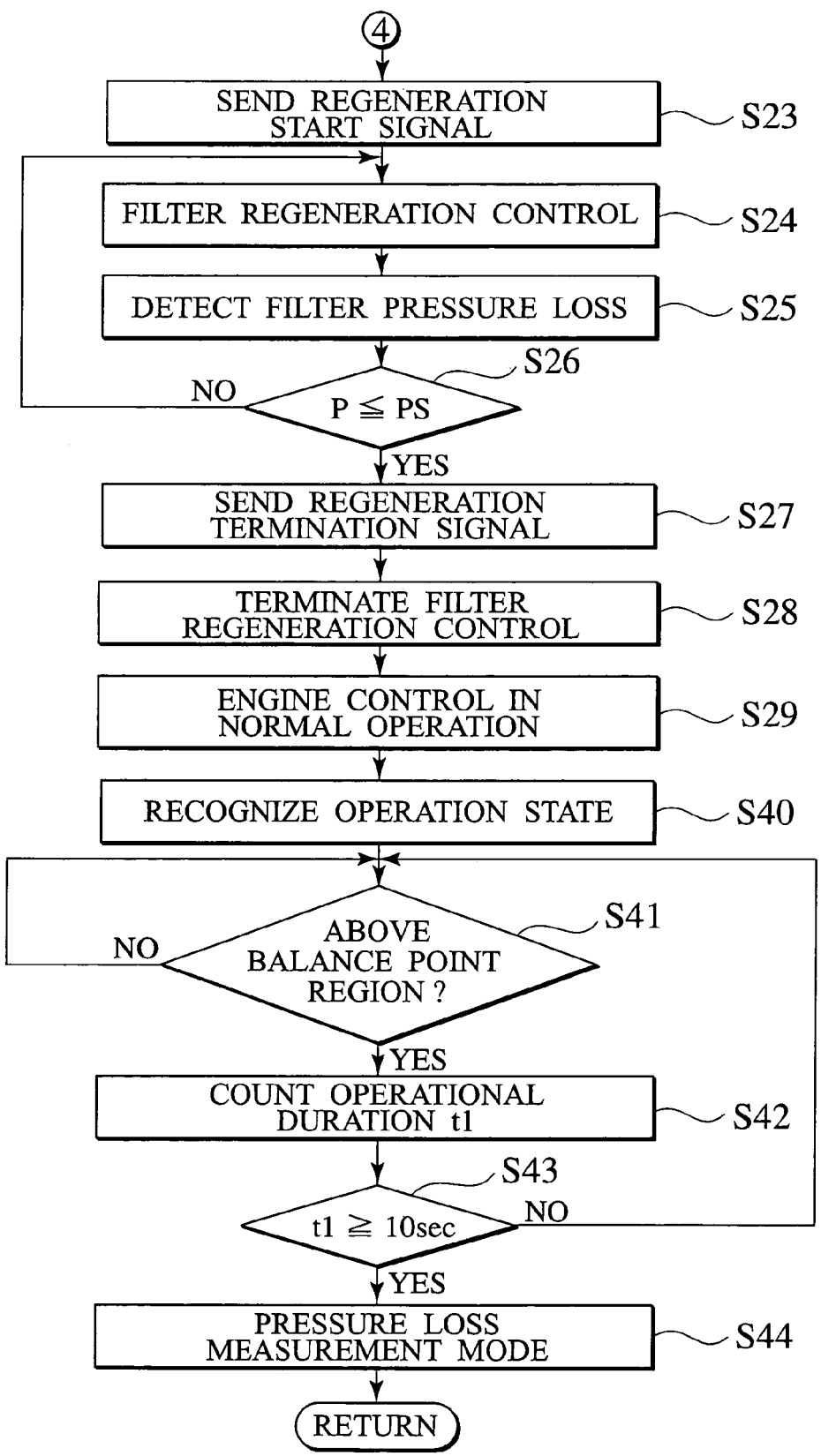
FIG. 10 is a flowchart for explaining an operation of the exhaust gas treatment system shown in FIG. 7.

At this time, as shown in FIG. 10, the ECU 34A recognizes an operation state of the engine 11 based on inputted engine revolution speed and torque (step S40). It refers to the balance point operation data stored in the memory 45A, to judge whether or not the recognized operation state is above the balance point region RB (step S41).

As a result, if not above the balance point region, the ECU 34A repetitively executes the judgment procedure at step S41.

Meanwhile, when the operation state is above the balance point region as a result of the judgment at step S41, the ECU 34A actuates a counter 47 to thereby count an operational duration t1 of the engine 11 in the operation state above the balance point region (step S42). Further, it is judged whether or not the duration t1 added up in the counter 47 is equal to or longer than a minimal operational duration (10 seconds) stored as the map data MP1 in the memory 45A (step S43).

According to this step S43, the ECU 34A repetitively executes the operation state judgment procedure at step S41 unless the operational duration t1 of the engine 11 exceeds the minimal operational duration of 10 seconds in an operation state above the balance point region (step S43).

Meanwhile, when the operational duration t1 of the engine 11 is equal to or longer than the minimal operational duration of 10 seconds, the ECU 34A judges that soot within the pores of the DPF 22 has been burnt out. Namely, the ECU 34A judges that the relationship between the current soot accumulation amount and pressure loss has substantially coincided with the relationship DS, thereby enabling an accurate ascertainment of a soot accumulation amount from a pressure loss by utilizing the relationship DS stored in the memory 45A.

Thus, the ECU 34A transfers to a pressure loss measurement mode, thereby enabling an accurate estimation of a current soot accumulation amount of the DPF 22 based on the pressure loss signal SI4 sent from the pressure detecting part 44 (step S44).

According to this embodiment as described above, it is judged whether or not the operational duration t1 in the state above the balance point region is equal to or longer than the minimally required operational duration (10 seconds). This makes it possible to judge whether or not the relationship between a residual soot amount and a pressure loss after regeneration has coincided with the relationship DS between soot accumulated only on the wall surface of the DPF 22 and the pressure loss.

As a result, it becomes possible to estimate an accurate soot accumulation amount from an obtained pressure loss and the relationship DS, at the time point when the relationship between a residual soot amount and a pressure loss after regeneration has coincided with the relationship DS between soot accumulated only on the wall surface of the DPF 22 and the pressure loss.

As such, it becomes possible to accurately ascertain a soot accumulation limit based on the estimated residual soot accumulation amount also at the next regeneration, thereby enabling achievement of DPF regeneration control in a reliable manner.

Note that in this embodiment, when the operation state of the engine 11 is not above the balance point region according to the judgment at step S41, the judgment procedure is repetitively executed until the operation state becomes above the balance point region. Further, in this embodiment, when the operation state of the engine 11 is above the balance point region but is not continued for 10 seconds or longer according to the judgment at step S43, the judgment procedure is repetitively executed until the operation state is continued for 10 seconds or longer. However, the present invention is not limited to this configuration.

Figure 11:
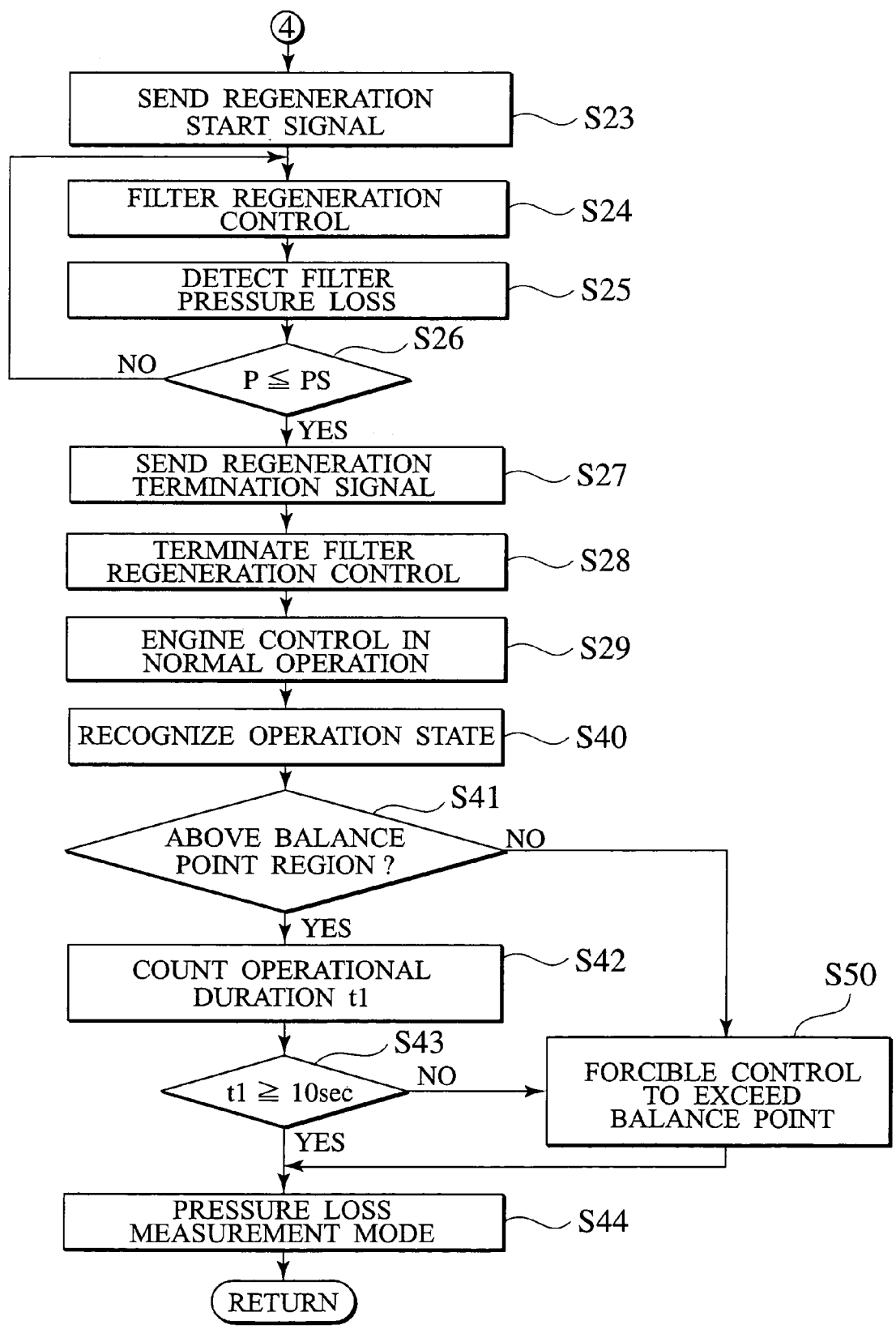
FIG. 11 is another flowchart for explaining the operation of the exhaust gas treatment system shown in FIG. 7.
Figure 12:
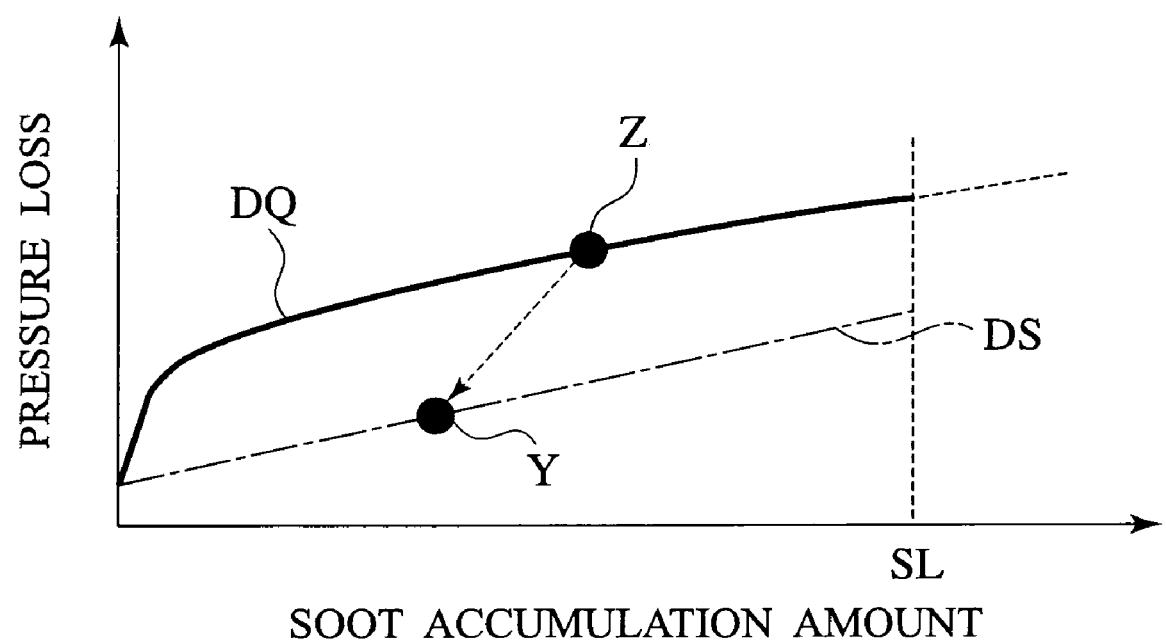
FIG. 12 is a graph for explaining an operation of an ECU shown in FIG. 7.

Namely, as a variant shown in FIG. 11 of this embodiment, the ECU 34A is configured to forcibly control the operational condition of the engine 11 to be brought to the above of the balance point region, when the operation state of the engine 11 is not above the balance point region at the judgment of step S41. Further, the ECU 34A is configured to forcibly control the operational condition of the engine 11 to be continued for 10 seconds or longer, when the operation state of the engine 11 is above the balance point region but is not continued for 10 seconds or longer at the judgment of step S43. This causes a soot amount in pores of the DPF 22 to be completely burnt out (step S50). Namely, as shown in FIG. 12, it is also possible to cause: a relationship between a residual soot accumulation amount and a pressure loss after regeneration; to be forcibly coincided with the relationship DS between soot accumulated only on the wall surface of the DPF 22, and a pressure loss (see point Y in the figure).

As a result, the ECU 34A is allowed to conduct measurement of a pressure loss and estimation of a soot accumulation amount in the pressure loss measurement mode at step S44, without repetitively conducting the judgment procedures at steps S41, S43.

Examples of methods for forcibly controlling the operational condition of the engine 11 include sending a post injection control signal from the ECU 34A to the engine 11, thereby causing the engine 11 to execute post injection to elevate an exhaust gas temperature. Another forcible controlling method is to control the intake throttle 19, EGR control valve 29, and the like, thereby increasing a combustion load of the engine 11 to elevate an exhaust gas temperature.

In this variant as described above, it is possible to estimate a soot accumulation amount of the DPF 22 after regeneration, without repetitively judging whether or not the operation state of the engine 11 is brought to the above of the balance point region, or whether or not the operation state above the balance point region is continued for 10 seconds or longer. This enables to rapidly estimate a soot accumulation amount of the DPF 22 after regeneration, in addition to the effects according to the second embodiment.

INDUSTRIAL APPLICABILITY

According to the method of estimating a soot accumulation amount of an exhaust gas purification filter, and a computer program product according to the present invention, there is firstly added up a period of time during which a temperature of exhaust gas flowing into the exhaust gas purification filter is equal to the balance point temperature or lower, after filter regeneration. When the added up period of time is equal to or longer than a period of time during which soot is accumulated to a certain extent in pores after filter regeneration, it becomes possible to more accurately estimate a residual soot accumulation amount after regeneration based on a relationship between a pressure loss and a soot accumulation amount where soot is accumulated to the certain extent, rather than where soot is not accumulated.

As such, it becomes possible to accurately ascertain the regeneration limit based on the estimated residual soot accumulation amount also at the next regeneration, thereby enabling achievement of filter regeneration control in a reliable manner.

Further, according to the method of estimating a soot accumulation amount of an exhaust gas purification filter, and a computer program product according to the present invention, it is firstly judged whether or not the engine is continuously operated for a predetermined period of time or longer in a state above the balance point region. This enables to judge whether or not the relationship between a residual soot amount and a pressure loss after regeneration, is coincided with a relationship between a soot accumulation amount and a pressure loss in a state where soot in the pores are burnt out.

As a result, when it is judged that the engine has been continuously operated for a predetermined period of time or longer in a state above the balance point region, it is possible to accurately estimate a residual soot accumulation amount after regeneration, based on the relationship between a soot accumulation amount and a pressure loss in a state where soot in the pores are burnt out.

As such, it becomes possible to accurately ascertain the regeneration limit based on the estimated residual soot accumulation amount also at the next regeneration, thereby enabling achievement of filter regeneration control in a reliable manner.

The invention claimed is:

1. A soot accumulation amount estimation method for an exhaust gas purification filter, comprising:
a first step of burning soot collected in pores of the exhaust gas purification filter to regenerate the filter;
a second step of detecting a temperature of exhaust gas flowing into the filter, to judge whether or not the exhaust gas temperature is equal to or lower than a predetermined temperature at which a soot amount flowing into the filter is substantially equal to a soot amount to be burnt in the filter;

a third step of adding up a period of time during which the exhaust gas temperature is equal to or lower than the predetermined temperature, when the exhaust gas temperature is equal to or lower than the predetermined temperature;

a fourth step of judging whether or not the added up period of time is equal to or longer than a period of time during which a predetermined amount of soot is accumulated in the pores after the first step; and a fifth step of estimating a soot accumulation amount of the filter based on a pressure loss through the filter, when the added up period of time is equal to or longer than the period of time during which the predetermined amount of soot is accumulated.

2. The soot accumulation amount estimation method for an exhaust gas purification filter as claimed in claim 1, wherein the predetermined temperature is 300° C., and the added up period of time is 30 minutes.

3. The soot accumulation amount estimation method for an exhaust gas purification filter as claimed in claim 1, further comprising: after the fourth step, judging whether or not a pressure loss commensurate with a soot amount accumulated in the filter after regeneration, is equal to or higher than a pressure loss corresponding to the predetermined amount.

4. A soot accumulation amount estimation method for an exhaust gas purification filter, comprising:

a first step of burning soot collected in pores of the exhaust gas purification filter to regenerate the filter;

a second step of judging whether or not an operation state of an engine is in a burning operation state where a soot amount to be burnt within the filter is larger than a soot amount flowing into the filter;

a third step of forcibly controlling an operational condition of the engine to be brought to the burning operation state when it is judged that the engine is not operated in the burning operation state;

a fourth step of judging whether or not the engine is continuously operated for a predetermined period of time or longer so as to burn out soot within the pores, when the operation state of the engine is judged to be in the burning operation state; and a fifth step of estimating a soot accumulation amount of the filter based on a pressure loss through the filter, when it is judged that the engine is continuously operated in the burning operation state for the predetermined period of time.

5. The soot accumulation amount estimation method for an exhaust gas purification filter as claimed in claim 4, wherein an exhaust gas purification system having the exhaust gas purification filter possesses data representing a relationship between a pressure loss and a soot accumulation amount of the filter in a state where soot within the pores are burnt out, and wherein the fifth step further comprises estimating a soot accumulation amount of the filter, based on a pressure loss through the filter after the burning operation and based on the data.

6. A soot accumulation amount estimation method for an exhaust gas purification filter comprising:

a first step of burning soot collected in pores of the exhaust gas purification filter to regenerate the filter;

a second step of judging whether or not an operation state of an engine is in a burning operation state where a soot amount to be burnt within the filter is larger than a soot amount flowing into the filter;

a third step of judging whether or not the engine is continuously operated for a predetermined period of time or longer so as to burn out soot within the pores, when the operation state of the engine is judged to be in the burning operation state;

a fourth step of forcibly controlling an operational condition of the engine such that the burning operation state is continued for a predetermined period of time or longer when it is judged that the engine is not keeping the burning operation state for the predetermined period of time; and a fifth step of estimating a soot accumulation amount of the filter based on a pressure loss through the filter, when it is judged that the engine is continuously operated in the burning operation state for the predetermined period of time.

7. A computer program product configured to be used for estimating a soot amount accumulated in an exhaust gas purification filter after burning soot collected from exhaust gas by the exhaust gas purification filter to thereby regenerate the filter, comprising:

a recording medium;

means recorded in the recording medium and configured to detect a temperature of exhaust gas flowing into the filter, to judge whether or not the exhaust gas temperature is equal to or lower than a predetermined temperature at which a soot amount flowing into the filter is substantially equal to a soot amount to be burnt in the filter;

means recorded in the recording medium and configured to add up a period of time during which the exhaust gas temperature is equal to or lower than the predetermined temperature, when the exhaust gas temperature is equal to or lower than the predetermined temperature;

means recorded in the recording medium and configured to judge whether or not the added up period of time is equal to or longer than a period of time during which a predetermined amount of soot is accumulated in the pores after the filter regeneration; and means recorded in the recording medium and configured to estimate a soot accumulation amount of the filter based on a pressure loss through the filter, when the added up period of time is equal to or longer than the period of time during which the predetermined amount of soot is accumulated.

8. A computer program product configured to be used for estimating a soot amount accumulated in an exhaust gas purification filter after burning soot collected from exhaust gas by the exhaust gas purification filter to thereby regenerate the filter, comprising:

a recording medium;

means recorded in the recording medium and configured to judge whether or not an operation state of an engine is in a burning operation state where a soot amount to be burnt within the filter is larger than a soot amount flowing into the filter;

means recorded in the recording medium and configured to forcibly control an operational condition of the engine to be brought to the burning operation state when it is judged that the engine is not operated in the burning operation state;

means recorded in the recording medium and configured to judge whether or not the engine is continuously operated for a predetermined period of time or longer so as to burn out soot within the pores, when the operation state of the engine is judged to be in the burning operation state; and means recorded in the recording medium and configured to estimate a soot accumulation amount of the filter based on a pressure loss through the filter, when it is judged that the engine is continuously operated in the burning operation state for the predetermined period of time.

9. The computer program product as claimed in claim 8, wherein the recording medium possesses data representing a relationship between a pressure loss and a soot accumulation amount of the filter in a state where soot within the pores are burnt out, and wherein the estimating means further comprises estimating a soot accumulation amount of the filter, based on a pressure loss through the filter after the burning operation and based on the data.

10. A computer program product configured to be used for estimating a soot amount accumulated in an exhaust gas purification filter after burning soot collected from exhaust gas by the exhaust gas purification filter to thereby regenerate the filter, comprising a recording medium;

means recorded in the recording medium and configured to judge whether or not an operation state of an engine is in a burning operation state where a soot amount to be burnt within the filter is larger than a soot amount flowing into the filter;

means recorded in the recording medium and configured to judge whether or not the engine is continuously operated for a predetermined period of time or longer so as to burn out soot within the pores, when the operation state of the engine is judged to be in the burning operation state;

means recorded in the recording medium and configured to forcibly control an operational condition of the engine such that the burning operation state is continued for a predetermined period of time or longer when it is judged that the engine is not keeping the burning operation state for the predetermined period of time; and means recorded in the recording medium and configured to estimate a soot accumulation amount of the filter based on a pressure loss through the filter, when it is judged that the engine is continuously operated in the burning operation state for the predetermined period of time.

* * * * *